Feb. 13, 1934.   G. JOHNSON   1,947,130
SEPARABLE SNAP FASTENER STUD
Filed May 8, 1930
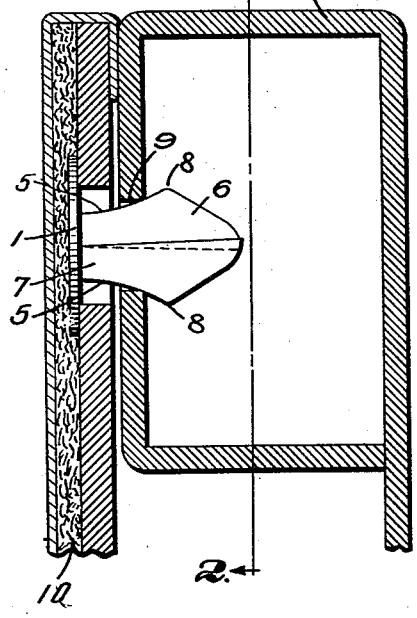
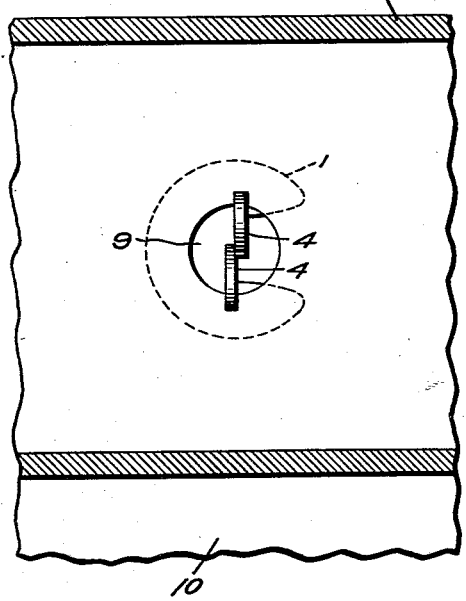
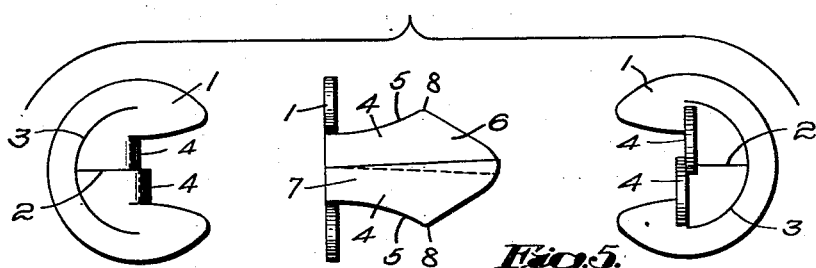
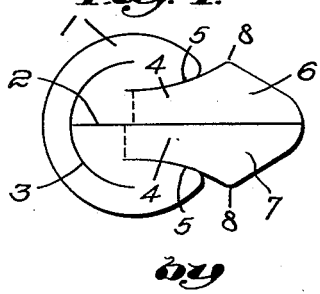
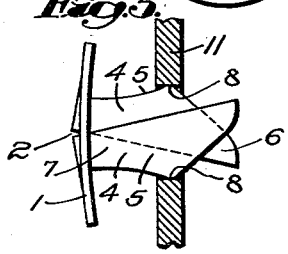

Patented Feb. 13, 1934

1,947,130

UNITED STATES PATENT OFFICE 1,947,130

SEPARABLE SNAP FASTENER STUD

Gustav Johnson, West Roxbury, Mass., assignor to United-Carr Fastener Corporation, Cambridge, Mass., a corporation of Massachusetts Application May 8, 1930. Serial No. 450,736

6 Claims. (Cl. 24—213)

My invention aims to provide improvements in separable snap fastener studs.

In the drawing which illustrates a preferred embodiment of my invention:—

Figure 1 is a vertical section through a portion of an upholstery installation showing one of my improved stud members in elevation;

Fig. 2 is a section taken on the line 2—2 of Figure 1;

Fig. 3 includes a rear, side and front elevation, respectively, of my improved snap fastener stud;

Fig. 4 is a plan view of a stud blank as it appears when cut from a strip and before the socket-engaging members are bent into proper positon; and Fig. 5 is a side elevation of the stud showing the manner in which the base bends when the head of the stud is forced through a stud-receiving aperture.

Referring to the particular embodiment of my invention illustrated by the drawing I have shown a sheet metal snap fastener stud member cut from a flat strip of metal and having the means which engages a cooperating socket member bent up into positon from a flat blank, as shown in Figs. 3 and 4. This type of stud is very inexpensive to manufacture, being much cheaper to make than a wire stud having the socket-engaging means made by means of a series of bending operations or a pressed metal stud having the shank made by a series of drawing operations. My stud member shown in the drawing is stamped out of thin sheet metal in blank form (Fig. 4) and a simple bending operation is all that is required to complete it.

The stud member illustrated has a base 1 having slits 2 and 3 cut through to permit the base to be flexed for purposes hereinafter described. Extending from the base 1 at right angles thereto and at opposite sides of the slit 2 are opposed projections 4—4 which provide the means for engagement with a cooperating socket, as shown in Figs. 1 and 2.

The projections 4—4 are located in different planes so that they may overlap (Fig. 3) and the outer edges 5—5 are so shaped that they provide a stud head portion 6 and a neck portion 7. These edges 5—5 diverge from the base to the shoulders 8—8 and then converge. The converging or head portion 6 is easily guided into an aperture and the diverging or neck portion readily adjusts itself to various thicknesses of metal when entered through an aperture because of the length of the neck.

It should be noted that the projections 4—4 are rigid throughout the length of each so far as any tendency to bend toward or away from each other is concerned. However, when a yieldable stud is desired for engagement with the wall of a stud-receiving aperture of fixed dimension (Fig. 1) the portions 4—4 are permitted to have a "scissors-like" action, one face of one projection being in line with one face of the other projection (Fig. 2), so that the distance between the two shoulders 8—8 may be reduced to the diameter of the stud-receiving aperture 9 when forced therethrough, as shown in Fig. 5. This "scissors-like" action is permitted by the fact that the slits 2 and 3 in the base so divide the base that the portions 4—4 are connected by a relatively long continuous yieldable portion which flexes in such a manner that the base becomes dish-shaped, as shown in Fig. 5. The shape and arrangement of the slits 2 and 3 may vary according to the shape and size of the base. However, I have found that the arrangement of the slits 2 and 3 according to the shape of the base, as shown in Fig. 3, is particularly satisfactory, because the flexing of the base is not concentrated in any one spot but is distributed, thereby preventing setting of the projections 4—4 when squeezed together.

The result of my invention is a strong, durable stud member which has a rather stiff spring action to hold the part, to which the stud is attached (the upholstery part 10), firmly in position with relation to the part to which said part is to be attached (the frame part 11).

I am aware that stud members cut and bent from sheet metal are old in a broad sense. However, I do not know of any prior stud which was formed similar to my improved stud or which had the same action, or arrangement of the elements thereof.

While I have shown and described a preferred embodiment of my invention and one adaptation thereof I do not wish to be limited thereby, because the scope of my invention is best defined in the following claims.

I claim:

1. A one-piece sheet metal snap fastener stud having a relatively flat base split to permit flexing of the metal of said base, a pair of flat thin projections extending from said base at substantially a right angle to the plane of said base and offset with relation to each other so that when moved toward each other edgewise one may cross the other, said projections having outer narrow edge portions diverging and shaped to enter and make fastening engagement with a cooperating fastener socket and said projections being adapted to move toward and away from each other due to the flexibility of said base so that the said projections may snap into and out of engagement with the said socket.

2. A sheet metal snap fastener stud having a base portion, a pair of flat, thin, socket engaging projections extending from the center of said base portion, and having edge portions shaped to enter and make fastening engagement with a cooperating fastener socket, one of said projections being offset with relation to the other so that one projection may cross the other, said base portion having two slits formed therein to permit yielding thereof so that the projections may move toward and away from each other, one of said slits following a portion of the circumference of said base portion and the other slit extending from the center of said base portion at a point between said projections to the first described slit.

3. A snap fastener stud formed entirely from a single piece of sheet metal and having a base split to permit flexing of the metal of said base, a pair only of flat thin projections extending from said base and movable relative to each other only because of the flexibility of said base, each of said projections having an outer narrow edge cooperating to engage a snap fastener socket means, said edges diverging from said base and then converging in substantially smooth uninterrupted lines to permit ready engagement and disengagement of the projections with the socket means, and each of said projections having a flat face facing a flat face of the other and being offset to permit said flat faces to pass in scissors-like action when the said outer edges are moved toward each other.

4. A snap fastener stud formed from a single piece of sheet metal and having a yieldable base 1, and a pair of projections 4—4 extending from said base 1 and each having a width substantially greater than its thickness to stiffen said projections, said projections having outer edges 5—5 shaped and cooperating to provide a stud head 6 and neck 7 and said projections being so positioned with respect to each other as to have a "scissors-like" action due only to the flexibility of said base when engaged with or disengaged from a socket having an aperture of fixed dimensions.

5. A sheet metal fastener of the snap type having a relatively flat base portion for engagement with a part to be held against another part, a shank consisting of two movable arms formed integral with and extending from said base portion at substantially a right angle to the plane of said base portion, said arms in their connection with said base portion being arranged so that each may flex at said base portion and move like the arms of a scissors when said arms are entered into an opening.

6. A snap fastener stud member formed from a single piece of sheet metal and having a relatively flat base, a pair only of flat thin projections extending from said base, each of said projections having an outer narrow edge cooperating to engage a snap fastener socket means, said edges diverging from said base and then converging in substantially smooth uninterrupted lines to permit ready engagement and disengagement of the projections with the socket means, and each of said projections having a flat face facing a flat face of the other and being offset to permit said flat faces to pass in scissors-like action when said outer edges are moved toward each other, and said base having a notch of substantial width extending from the periphery of said base toward said projections and also having a slit at least a part of which extends through said base between said projections to permit said base to flex during the scissors-like action of said projections.

GUSTAV JOHNSON.